June 4, 1940.  E. F. WESTON  2,203,209
EXPOSURE METER
Filed Jan. 24, 1939
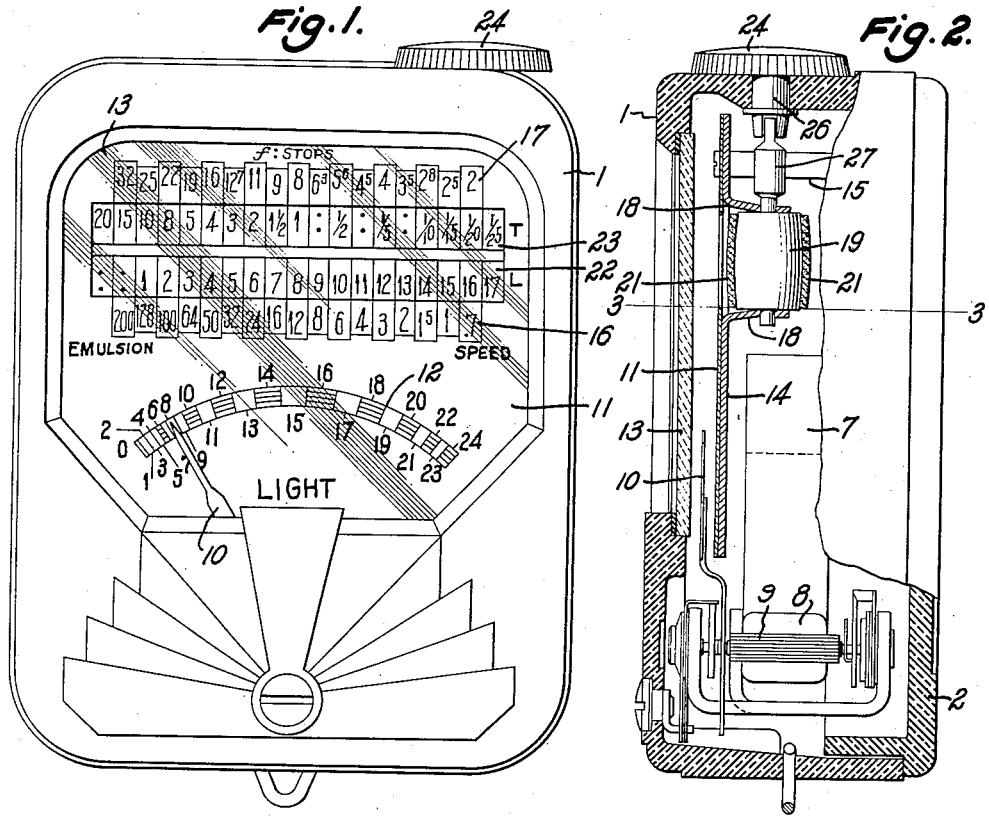
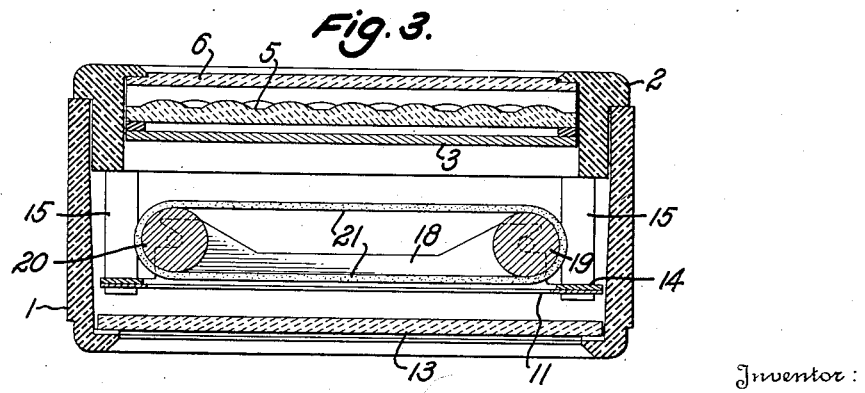
Inventor:
Edward F. Weston,
By Potter, Prince & Schiffler,
Attorneys.

Patented June 4, 1940

2,203,209

UNITED STATES PATENT OFFICE 2,203,209

EXPOSURE METER

Edward F. Weston, Montclair, N. J., assignor to Weston Electrical Instrument Corporation, Newark, N. J., a corporation of New Jersey Application January 24, 1939, Serial No. 252,663

8 Claims. (Cl. 88—23)

This invention relates to exposure meters and particularly to exposure meters having a photoelectric system for measuring the average brightness of a scene and a computer for evaluating the measured scene brightness and the emulsion speed of the film to determine appropriate values of shutter speed and diaphragm opening.

An object of the invention is to provide an exposure meter of small size in which the instrument scale and computer elements are so arranged that the operator may hold the exposure meter and adjust the computer with one hand. An object is to provide an exposure meter having a casing housing a photoelectric cell, an instrument, a linearly movable computer band arranged above the instrument scale, and a knob for adjusting the band; the knob or button being positioned at the top of the casing for movement by one finger of the hand which holds the casing.

These and other objects and advantages of the invention will be apparent from the following specification when taken with the accompanying drawing in which:

Fig. 1 is a front elevation of an embodiment of the invention;

Fig. 2 is a side elevation of the exposure meter, with parts in section; and

Fig. 3 is a transverse section taken substantially on line 3—3 of Fig. 2.

In the drawing, the reference numeral 1 identifies the cover member which is secured to the instrument base 2 to form a casing for the photoelectric system and the computer of the exposure meter. A photocell 3 of the current generating or barrier layer type is mounted on the base 2 in line with a window opening, and a baffle system comprising multiple lens plate 5 is located between the cell 3 and the glass cover plate 6 to limit the angular spread of the light rays that reach the cell.

The measuring instrument is supported on the base 2 in the usual manner and includes a permanent magnet 7, core 8 and coil 9 carrying a pointer 10. The coil 9 is connected across the photocell 3 in the usual manner and its angular movement in response to the current output of the photocell displaces the pointer 10 over a scale plate 11 on which there is an arcuate scale 12 of brightness values that is identified by the legend "Light." The markings of the scale are arbitrary and are illustrated as the numbers 0–24, inclusive. The relationship of the scale marking to brightness values will be described later and, for present purposes of description, it may be stated that successive scale divisions correspond to brightness values having a definite ratio which, for the illustrated computer graduations, is $$1:\sqrt{2}$$

The cover 1 has a relatively large window opening, closed by a cover glass 13, through which the pointer 10 and scale plate 11 are visible. The scale plate 11 is carried by a mounting plate 14 that is supported from the base 2 by posts 15, and both the scale plate and mounting plate have a rectangular opening therethrough. A scale 16 of emulsion speed values is printed on the scale plate at the lower edge of the opening, and a scale 17 of diaphragm openings appears along the upper edge of the opening. Adjacent stop values are so related that the resultant exposure values are in the ratio of $$1:\sqrt{2}$$

and the adjacent emulsion speed values bear the same relationship. The emulsion speed scale may be graduated in accordance with any desired system and, as shown, carries graduations in "Weston" film speed numbers of from 0.7 to 200.

The opening in the mounting plate 15 is formed by slotting the plate and turning back sections 18 of the plate to form flanges in which the pulleys or drums 19, 20 are pivotally mounted. The movable element of the computer takes the form of a flexible belt 21 that is preferably of soft rubber and somewhat undersized, whereby the stretching of the belt to fit over the drums 19, 20 provides the necessary frictional engagement for the driving of the belt. As shown in Fig. 1, the lower edge of the belt 21 carries a scale 22 that is graduated in the values 1–24 of the brightness or light scale 12 of the measuring instrument. The upper edge of the belt carries a printed scale 23 of exposure times which alines with the f-scale 17 on the scale plate 11. Initial letters "L" and "T" may be placed on the scale plate 11 in line with the scales 22, 23 of light values and exposure times, respectively.

The mechanism for adjusting the computer belt 21 comprises a knob 24 that is arranged at the upper right corner of the exposure meter, when in the normal position of use as shown in Fig. 1; the knob being on a shaft 26 that extends through the cover member 1 and has a slotted inner end for receiving the blade on the upper end of the stem 27 that is secured to the drum 19. It will be apparent that the knob 24 may be adjusted angularly by the thumb or a finger of the right hand when the operator holds the exposure meter at eye level with the front of the casing towards the scene to be photographed.

The exposure meter is employed in the following manner to determine corresponding values of diaphragm opening and the exposure time for the selected film and the existing scene brightness. The operator holds the casing in his right hand with the photocell window of the instrument base 2 normal to the line from the center of the scene, and notes the pointer displacement. He then adjusts the knob 24 to aline the measured light value on scale 22 of the computer band 21 with the emulsion speed value on the fixed scale 16 of scale plate 11. This operation places the exposure time scale 23 of the band 21 in proper relation to the diaphragm opening scale 17.

The parts as shown in Fig. 1 indicate a measured brightness value of "8," and this number on the light scale 22 of band 21 has been alined with the emulsion speed value of "12" on scale 16. Various combinations of diaphragm openings and shutter speeds are indicated by the alinement of the scales 17 and 23. If the scene is such that a small diaphragm opening is appropriate, for example f16, the exposure meter indicates that an exposure of 4 seconds is required. If the scene includes moving objects, the indicated combination of 1/20 second exposure at f2 may be more satisfactory.

The relative arrangement of the several cooperating scales may of course be varied but the illustrated arrangement is believed to be preferable for a number of reasons. Only one setting of the band is required for any given instrument reading when the shutter timing scale and diaphragm stops scale are associated. The locations of these scales on the fixed and movable member of the computer could be reversed but it is preferable to graduate the fixed scale in diaphragm openings as this scale is of but limited extent. Similarly, the emulsion speed and light value scales could be interchanged but the range of emulsion speeds is less than the range of brightness values and relatively wide computer graduations are therefore possible when the scale at the lower edge of the computer is graduated in emulsion speeds. The emulsion speed scale may be located on the lower edge of the band 21 when the instrument brightness scale has a smaller number of divisions. The instrument scale graduations could then be omitted by extending guide lines from the sections of the instrument scale to the corresponding sections of a scale on the plate 11 adjacent an emulsion speed scale on the lower edge of the band 21.

It is to be understood that the invention is not restricted to the particular embodiment herein shown and described, and that there is considerable latitude in the design and construction of exposure meters that fall within the spirit of the invention as set forth in the following claims.

I claim:

1. An exposure meter comprising a casing, a photoelectric cell and a measuring instrument within said casing, said instrument being connected to said cell and including a pointer movable over a plate carrying scale divisions corresponding to brightness values, said plate having a rectangular opening therethrough above said scale, a computer strip visible through said opening, means supporting said strip for displacement along the opening, means operable manually to displace said strip, cooperating scales of exposure time and diaphragm stop on the plate and the upper edge of the strip, and cooperating means on the lower edge of said strip and said plate for setting the strip in accordance with emulsion speed and the measured brightness value, one of said cooperating means being a scale of emulsion speeds.

2. An exposure meter as claimed in claim 1, wherein the brightness scale of said instrument has indicia identifying the several scale divisions, and the other of said cooperating means is a scale of brightness graduated in the same indicia as the brightness scale of said instrument.

3. An exposure meter as claimed in claim 1, wherein said computer strip is an endless band, said supporting means is a pair of drums, and said manually operable means is a knob connected to one of said drums for rotating the same.

4. An exposure meter comprising a casing having openings in the front and back walls thereof, a photocell within the casing to receive light entering through the opening in the front wall, an instrument within the casing and connected to said photocell, said instrument having a pointer and scale plate visible through the opening in the rear wall, and a computer visible through said opening in the rear wall for evaluating emulsion speed and measured brightness value to determine cooperating exposure times and diaphragm openings; said computer including an endless band carrying graduations of an exposure factor, a cooperating set of graduations of another exposure factor on said scale plate, drums positioned in the upper part of the casing and supporting said endless band for movement to displace the graduations thereon along the set of graduations on said scale plate, and a knob for rotating one of the drums, said knob being at the upper right corner of the casing.

5. A photoelectric exposure meter comprising a casing, a photoelectric cell and a measuring instrument within the casing, said instrument being connected to said cell and including a pointer movable over a plate bearing a scale of brightness values, said plate having a rectangular opening therethrough above said brightness scale, a belt visible through said opening and having an exposure factor scale along each edge thereof, scales of other exposure factors on said plate adjacent and cooperating with the scales of said belt, and means operable manually to displace said belt; one of said scales being graduated in the same brightness values as said brightness scale and the cooperating scale being graduated in emulsion speeds, and the other pair of cooperating scales being graduated in shutter timings and in diaphragm openings respectively.

6. A photoelectric exposure meter as claimed in claim 5, wherein the scales of shutter timings and diaphragm openings are on the upper edge of the belt and the adjacent section of said plate, and the scale of brightness values is on the lower edge of the belt.

7. An exposure meter comprising a casing including a cover section and a base, a photocell mounted on the base, an instrument mounted on the base and including a pointer movable over a scale plate, said instrument being connected to said photocell, a mounting plate secured to the base and supporting said scale plate, alined openings in said scale plate and mounting plate, drums pivotally supported on said mounting plate, a flexible computer band extending over said belt and visible through said openings, scales of exposure factors on the upper and lower edges of said band, cooperating scales of exposure factors on the scale plate adjacent the upper and lower edges of said band, a knob mounted on the cover section of said casing, a stem on one of said drums, and a cooperating fin and slot on said knob and stem for coupling the knob to the stem when the cover section is assembled on the base.

8. A photoelectric exposure meter comprising a casing housing a photocell and a measuring instrument, said instrument being connected to said photocell and including a pointer movable over a plate bearing a scale of brightness values, said plate having a rectangular opening therethrough above the said brightness scale, a scale of emulsion speeds on said plate adjacent one edge of the opening, a scale of one of the exposure factors of shutter timing and diaphragm opening adjacent the other edge of said opening, an endless band supported for movement with one section thereof exposed through said opening, a scale of brightness values along one edge of said band, and a scale of the other of said exposure factors along the other edge of said band.

EDWARD F. WESTON.